(12) United States Patent
Aubert et al.

(10) Patent No.: US 9,058,552 B2
(45) Date of Patent: Jun. 16, 2015

(54) RFID TAG TEMPERATURE ADAPTATION

(75) Inventors: Denis Aubert, La Gaude (FR); Xavier Bocquet, La Gaude (FR); Joaquin Picon, La Gaude (FR); Bernard Y. Pucci, Cagnes sur Mer (FR)

(73) Assignee: International Business Machines Corporation, Armonk, NY (US)

( * ) Notice: Subject to any disclaimer, the term of this patent is extended or adjusted under 35 U.S.C. 154(b) by 137 days.

(21) Appl. No.: 13/343,298

(22) Filed: Jan. 4, 2012

(65) Prior Publication Data

US 2013/0106579 A1 May 2, 2013

(30) Foreign Application Priority Data

Oct. 26, 2011 (EP) .................................... 11306387

(51) Int. Cl.
*H04Q 5/22* (2006.01)
*G06K 19/077* (2006.01)

(52) U.S. Cl.
CPC ........ *G06K 19/077* (2013.01); *G06K 19/07749* (2013.01); *G06K 19/07771* (2013.01)

(58) Field of Classification Search
CPC .................................................... G06K 7/0008
USPC ................. 340/10.1, 10.42, 539.27, 640
See application file for complete search history.

(56) References Cited

U.S. PATENT DOCUMENTS

| 6,232,585 | B1 | 5/2001 | Clothier et al. | |
|---|---|---|---|---|
| 6,648,232 | B1 | 11/2003 | Emmert | |
| 7,350,703 | B2* | 4/2008 | Ambartsoumian | 235/385 |
| 7,557,708 | B1 | 7/2009 | Pacholok et al. | |
| 7,794,142 | B2* | 9/2010 | Clothier et al. | 374/163 |
| 2007/0216532 | A1 | 9/2007 | Lansdowne | |
| 2008/0018479 | A1* | 1/2008 | Hashimoto et al. | 340/572.8 |
| 2008/0197126 | A1* | 8/2008 | Bourke et al. | 219/634 |
| 2009/0081424 | A1* | 3/2009 | Gomi | 428/195.1 |
| 2010/0007501 | A1 | 1/2010 | Yang et al. | |
| 2010/0123581 | A1* | 5/2010 | Hatfield et al. | 340/572.3 |
| 2010/0147832 | A1* | 6/2010 | Barker et al. | 219/626 |
| 2010/0322283 | A1* | 12/2010 | Clothier et al. | 374/176 |

(Continued)

FOREIGN PATENT DOCUMENTS

CN   201369061 Y   12/2009
WO   2006130760 A2   12/2006

(Continued)

OTHER PUBLICATIONS

Patent Cooperation Treaty, International Search Report for PCT/IB2012/055354 dated Mar. 7, 2013, 3 pages.
Hichri et al. "RFID System for the Identification of Biological Samples," Abstract Only, Sep. 2010, IEEE Xplore (http://dx.doi.ort/10.1109/ESTC.2010.5642975).

(Continued)

*Primary Examiner* — Hai Phan
*Assistant Examiner* — Zhen Y Wu
(74) *Attorney, Agent, or Firm* — Edward J. Wixted, III; Nicholas Cadmus

(57) ABSTRACT

An RFID system and tag, and a method for identifying objects using an RFID system are disclosed. In an embodiment, an RFID tag comprises a microchip for storing an identification sequence, a tag antenna coupled with the microchip for receiving and transmitting the RF signal; and a ferrous metal portion disposed near the IC and the tag antenna. The ferrous metal portion is sensitive to, and heats up when subjected to, magnetic induction. The heat of the ferrous metal is propagated to the RFID tag such that the tag reaches its operating temperature more quickly.

12 Claims, 3 Drawing Sheets

(56) References Cited

U.S. PATENT DOCUMENTS

| | | | |
|---|---|---|---|
| 2010/0328037 A1* | 12/2010 | Thomas et al. | 340/10.1 |
| 2010/0328041 A1* | 12/2010 | Arrigo | 340/10.1 |
| 2011/0289023 A1* | 11/2011 | Forster et al. | 705/500 |

FOREIGN PATENT DOCUMENTS

| | | | |
|---|---|---|---|
| WO | 2007024540 | A1 | 3/2007 |
| WO | 2008108862 | A2 | 9/2008 |

OTHER PUBLICATIONS

Raftar, "RFID Tags Under Pressure: Can RFID Tags Withstand High Pressure Steam and Autoclave Sterilization?," 1 page, Jul. 2010 (http://blog.raftarcorp.com/2010/07/rfid-tags-under-pressure-can-rfid-tags.html).

"Cryogenic RFID Tags Aim to End to IVF Mix Ups," 2 pages, Copyright 2011 LexisNexis, retrieved from: http://www.allbusiness.com/print/15096132-1-9a0bs.html.

* cited by examiner

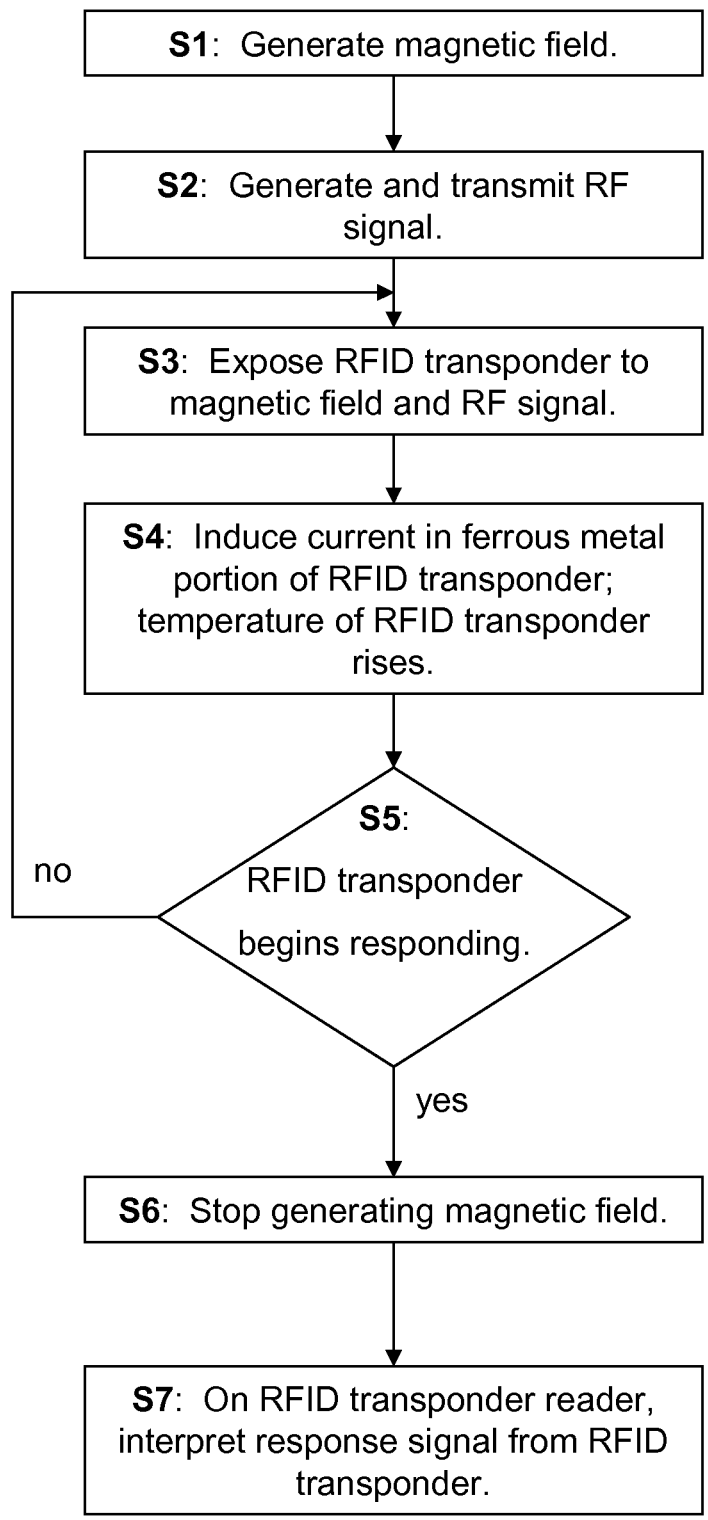

RFID TAG TEMPERATURE ADAPTATION

CROSS-REFERENCE TO RELATED APPLICATIONS

This application claims the benefit of European Patent Application No. 11306387.9 filed 26 Oct. 2011, which is hereby incorporated herein.

BACKGROUND OF THE INVENTION

The disclosure relates generally to identification of biological samples, and more particularly, to the use of a radio frequency identification system for identifying containers which may contain biological samples therein.

Radio frequency identification, or RFID, is a generic term for technologies that use radio waves to identify objects, such as, e.g., containers for biological samples. RFID tags may store a series number or other identifier that identifies the container or the contents thereof, on a microchip attached to an antenna. Collectively, the microchip and antenna are referred to as an RFID tag or RFID transponder.

RFID tags can be categorized as active, semi-passive, and passive RFID tags, which can be distinguished from one another on the basis of power supply. Passive RFID tags are battery-free, and react to a specific, reader-produced inductively coupled or radiated electromagnetic field by delivering a data modulated RF response. Passive RFID tags draw power from the reader, which emits electromagnetic waves that induce a current in the antenna of the RFID tag. The voltage generated may be stored in a capacitor in the RFID tag. The RFID tag then transmits data stored in the RFID tag microchip back to the RFID tag reader, e.g., by switching low resistance across the antenna coil, and the capacitor discharges. The change in voltage across the RFID tag antenna generates an RF signal referred to as backscattering. When the signal is received at the RFID tag reader, the reader removes or demodulates the carrier RF signal, and the resulting digital signal can be decoded.

Active RFID tags, in contrast, include a transmitter for sending information to the reader rather than merely reflecting a signal from the reader as the passive RFID tag does. In order to provide power for the signal transmission, active RFID tags include a power source, such as a long-life battery, which provides power to the circuit of the microchip and to the antenna to broadcast a signal to a reader. Semi-passive RFID tags are a hybrid of the two. They include batteries, but they communicate using the same backscatter technique as passive RFID tags, using battery power only to run the circuitry of the microchip, and in some cases an onboard sensor. Semi-passive RFID tags have a longer read range than passive RFID tags because all of the energy gathered from the reader can be reflected back to the reader. Active and semi-passive RFID tags are typically used to track high value goods that need to be scanned over long ranges, and are typically more expensive to produce than passive RFID tags. Passive RFID tags, in contrast, may use ultra-high frequency RF waves, and may have a shorter range such as, e.g., less than 20 feet.

Biological samples are typically stored in containers or vials, and may be kept at conservation temperatures of about −170° C. (−274° F.). These vials may be equipped with RFID tags affixed to the vials using an adhesive for identifying the samples. In many cases, passive RFID tags are used in such applications. Before selecting a sample for use or testing, the RFID tag must be read in order to identify the requested sample. Before they can be read, however, conventional RFID tags must be warmed to a temperature of about −80° C. (−112° F.), which may take upwards of 20 minutes. This may cause the tagged biological sample to reach and sustain higher temperatures than may be desirable to maintain the sample's integrity.

Examples of biological samples which may be stored in this manner may include, for example, samples collected during clinical trials of pharmaceuticals, research samples in labs, samples archived in hospitals, forensic samples from crimes or disasters, samples maintained at the Center for Disease Control (CDC), and samples used for in vitro fertilization.

BRIEF DESCRIPTION OF THE INVENTION

A first aspect of the disclosure provides an RFID tag or transponder comprising: a microchip for storing an identification sequence; a tag antenna coupled with the microchip for receiving and transmitting an RF signal; and a ferrous metal portion disposed about the tag antenna, wherein the ferrous metal portion is sensitive to magnetic induction.

A second aspect of the disclosure provides an RFID system comprising an RFID tag reader and an RFID tag. The RFID tag reader includes a transceiver for generating an RF signal; a reader antenna coupled to the transceiver for transmitting the RF signal; and a magnetic field generator. The RFID tag includes a microchip for storing an identification sequence; a tag antenna coupled with the microchip for receiving and transmitting the RF signal; and a ferrous metal portion disposed about the tag antenna, wherein the ferrous metal portion is sensitive to magnetic induction.

A third aspect of the disclosure provides a method for identifying an object. The method includes, using an RFID tag reader, generating a magnetic field, generating an RF signal, and transmitting the RF signal; exposing an RFID tag to the RF signal and the magnetic field. The RFID tag includes a ferrous metal portion. The method further includes, with the magnetic field, inducing a current in the ferrous metal portion, raising a temperature of the ferrous metal portion; and on the RFID tag, converting the RF signal to a current, and transmitting data stored on a microchip on the RFID tag to the RFID tag reader.

These and other aspects, advantages and salient features of the invention will become apparent from the following detailed description, which, when taken in conjunction with the annexed drawings, where like parts are designated by like reference characters throughout the drawings, disclose embodiments of the invention.

BRIEF DESCRIPTION OF THE DRAWINGS

FIGS. 1-2 show component parts of FIG. 3.

FIG. 5 shows a flow chart depicting a method in accordance with embodiments of the invention.

DETAILED DESCRIPTION OF THE INVENTION

As indicated above, aspects of the invention provide an RFID system including an RFID tag, and an RFID reader, as well as a method for identifying an object using the RFID tag and RFID reader.

Figure 1:
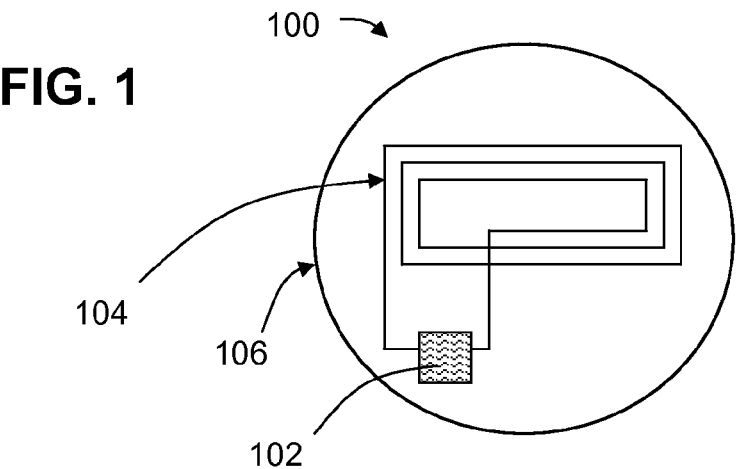
FIGS. 1-3 show aspects of an RFID tag in accordance with embodiments of the invention, where
Figure 2:
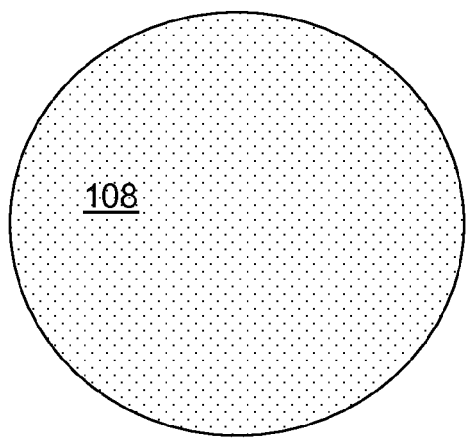
Figure 3:
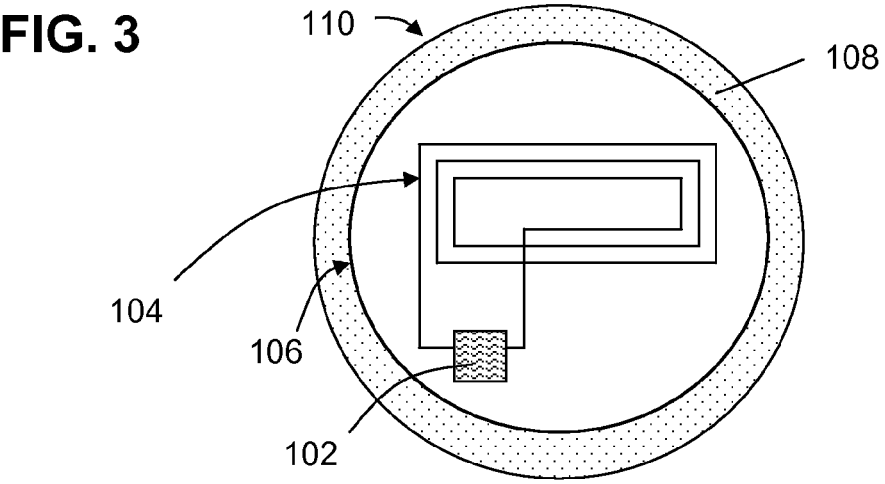

FIGS. 1-3 show aspects of an RFID tag 100 in accordance with an embodiment of the invention. FIG. 1 shows an RFID tag 100 including a microchip 102 including an integrated circuit (IC), which serves to modulate and de-modulate a radio-frequency (RF) signal, and a tag antenna 104 coupled with the microchip 102 for receiving and transmitting the RF signal. RFID tag 100 may further include packaging 106 which may cover or provide structural support for RFID tag 100, and may be used to affix RFID tag 100 to container 112, discussed further below. Packaging 106 may be, in some embodiments, plastic. A ferrous metal portion 108, shown in FIG. 2, may further be affixed to RFID tag 100 as shown in FIG. 3, resulting in an RFID tag 110 that includes a ferrous metal portion 108. Ferrous metal portion 108 is sensitive to magnetic induction, and may be a ferrous metal sheet in some embodiments. Ferrous metal portion 108 may be Fe in some embodiments. Ferrous metal portion may be disposed directly adjacent to microchip 102 and tag antenna 104, or may be separated from microchip 102 and tag antenna 104 by a portion of packaging 106.

Figure 4:
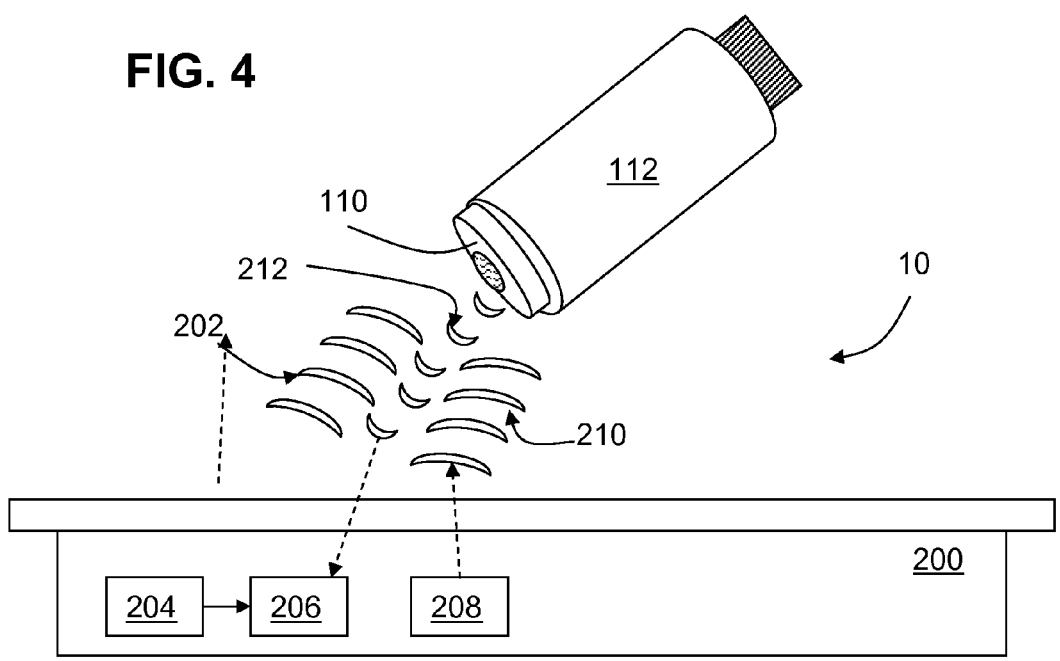
FIG. 4 shows an RFID system in accordance with embodiments of the invention.

As shown in FIG. 4, RFID tag 110 may be adhered to a container 112 for use in identifying container 112 or the contents thereof. Container 112 may be, e.g., a vial, or other type of container. In one embodiment, container 112 may contain a biological sample. Container 112, and the biological sample contained therein, may be stored in a cryogenic, low temperature environment, and may be stored at a temperature of about −170° C.

As further shown in FIG. 4, RFID system 10 further includes an RFID tag reader 200. RFID tag reader 200 may include transceiver 204 for generating an RF signal, as well as reader antenna 206 coupled to transceiver 204 for transmitting RF signal 202. RFID tag reader 200 further includes a magnetic field generator 208 for generating magnetic induction field including waves 210. When RFID tag 110 is passed within range of magnetic induction waves 210, magnetic induction waves 210 induce an eddy current in ferrous metal portion 108. Resistance to these eddy currents causes the temperature of ferrous metal portion 108 to rise. Because ferrous metal portion 108 is disposed either directly adjacent or near microchip 102 and tag antenna 104, when ferrous metal portion 108 is warmed, the heat of ferrous metal portion 108 is propagated to RFID tag 110 such that RFID tag 110 including tag antenna 104 reaches its operating temperature quickly. This keeps the contents of container 112, e.g., a biological sample, at a lower temperature, thereby minimizing the cold chain impact. Due to the relatively small size of RFID tag 110 and ferrous metal portion 108, the temperature of the sample contained in container 112 is not changed appreciably. Thus, RFID tag 110 can be warmed to allow for reading by RFID tag reader 200 without significantly raising the temperature of the sample contained in container 112 or meaningfully impacting its integrity. In some embodiments, when subjected to magnetic induction, ferrous metal portion 108 may cause RFID tag 110 to be warmed to a temperature of about −80° C. to about −70° C., a temperature at which RFID tag reader 200 may read RFID tag 110. When RFID tag 110 reaches a temperature at which it can be read, i.e., tag antenna 104 (FIG. 3) begins responding or reflecting 212 the signal transmitted by reader antenna 206 back to RFID tag reader 200, magnetic field generator 208 ceases generating magnetic induction waves 210. This avoids ferrous metal portion 108 becoming any warmer than necessary to allow reading of RFID tag 110.

As shown in FIG. 5, a method is also provided for identifying an object, which in some embodiments may be a container 112 having a biological sample therein. In step S1, using RFID tag reader 200, which includes magnetic field generator 208, a magnetic field 210 is generated. In step S2, using transceiver 204, RF signal 202 is generated, and using reader antenna 206, RF signal 202 is transmitted from RFID tag reader 200. In step S3, RFID tag 110 is exposed to RF signal 202 and magnetic field 210. RFID tag 110 includes a ferrous metal portion 108 as described above. In step S4, magnetic field 210 induces a current in ferrous metal portion 108, and causes the temperature of RFID tag 110 to rise. In step S5, RFID tag may start to respond to the RFID signal generated and transmitted in step S2. If it does not respond, steps S3 and S4 are repeated until RFID tag 110 begins to respond. A response from RFID tag 110 typically includes a transmission from tag antenna 104 that reflects RF signal 202 back to reader antenna 206 and contains the identification information stored in microchip 102. In some embodiments, in step S6, once RFID tag 110 begins responding, RFID tag reader ceases generating magnetic induction waves 210 to avoid further warming RFID tag 110 and possibly container 112. In step S7, RFID tag reader 200 reads or interprets the signal received from RFID tag 110, including removing or demodulating the carrier RF signal, and the resulting digital signal can be decoded. In further embodiments, ferrous metal portion 108 may be used affixed to any other type of electronic device not limited to RFID tag 110, such as, e.g., a probe, which needs to be warmed up quickly in order to become operational.

As used herein, the terms "first," "second," and the like, do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the stated value and has the meaning dictated by the context (e.g., includes the degree of error associated with measurement of the particular quantity). The suffix "(s)" as used herein is intended to include both the singular and the plural of the term that it modifies, thereby including one or more of that term (e.g., the metal(s) includes one or more metals). Ranges disclosed herein are inclusive and independently combinable (e.g., ranges of "up to about −70° C., or, more specifically, about −80° C. to about −70° C.," is inclusive of the endpoints and all intermediate values of the ranges of "about −80° C. to about −70° C.," etc.).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An RFID system comprising:
    an RFID tag reader including:
        a transceiver for generating an RF signal;
        a reader antenna coupled to the transceiver for transmitting the RF signal; and
        a magnetic field generator, wherein the RFID tag reader stops generating a magnetic field when an RFID tag responds to the RFID tag reader; and
    an RFID tag, wherein the RFID tag is heated from a non-operating temperature to an operating temperature, including:
        a microchip for storing an identification sequence;
        a tag antenna coupled with the microchip for receiving and transmitting the RF signal; and a ferrous metal portion, substantially similar in size to the RFID tag, disposed about the tag antenna and the microchip, wherein the ferrous metal portion is sensitive to magnetic induction, and wherein the ferrous metal portion is operative to heat the RFID tag from a non-operating temperature to an operating temperature.

2. The RFID system of claim 1, wherein the ferrous metal portion further comprises iron.

3. The RFID system of claim 1, wherein the RFID tag is adhered to a biological sample container.

4. The RFID system of claim 1, further comprising a packaging for affixing the RFID tag to a container.

5. The RFID system of claim 1, wherein the non-operating temperature is a cryogenic temperature.

6. The RFID system of claim 1,
wherein the RFID tag is stored at the non-operating temperature of about −170° C., and
wherein induction of a current in the ferrous metal portion by a magnetic induction wave generated by the magnetic field generator causes the RFID tag to be heated to the operating temperature of at least about −80° C.

7. A method for identifying an object comprising:
using an RFID tag reader,
generating a magnetic field,
generating an RF signal, and
transmitting the RF signal;
exposing an RFID tag at a non-operating temperature to the RF signal and the magnetic field, wherein the RFID tag includes a ferrous metal portion;
with the magnetic field, inducing a current in the ferrous metal portion, raising a temperature of the ferrous metal portion which increases the temperature of the RFID tag from a non-operating temperature to an operating temperature; and
on the RFID tag, in response to the temperature of the RFID tag reaching an operating temperature,
converting the RF signal to a current, and
transmitting data stored on a microchip on the RFID tag to the RFID tag reader; and
on the RFID tag reader, in response to receiving the data stored on the microchip on the RFID tag, ceasing to generate a magnetic field.

8. The method of claim 7, wherein the ferrous metal portion further comprises a ferrous metal sheet.

9. The method of claim 7, further comprising adhering the RFID tag to a biological sample container.

10. The method of claim 7, further comprising covering the RFID tag with a packaging.

11. The method of claim 7, wherein the non-operating temperature is a cryogenic temperature.

12. The method of claim 7, wherein the operating temperature is at least about −80° C.

* * * * *